US011202059B2

(12) United States Patent
Kurata

(10) Patent No.: US 11,202,059 B2
(45) Date of Patent: Dec. 14, 2021

(54) IMAGE PROCESSING APPARATUS AND IMAGE PROCESSING METHOD

(71) Applicant: Sony Interactive Entertainment Inc., Tokyo (JP)

(72) Inventor: Daisuke Kurata, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/967,470

(22) PCT Filed: Feb. 21, 2018

(86) PCT No.: PCT/JP2018/006283
§ 371 (c)(1),
(2) Date: Aug. 5, 2020

(87) PCT Pub. No.: WO2019/163031
PCT Pub. Date: Aug. 29, 2019

(65) Prior Publication Data
US 2021/0144359 A1    May 13, 2021

(51) Int. Cl.
*H04N 13/31*       (2018.01)
*H04N 13/383*      (2018.01)
(Continued)

(52) U.S. Cl.
CPC ......... *H04N 13/31* (2018.05); *G02B 27/0093* (2013.01); *G02B 27/0101* (2013.01);
(Continued)

(58) Field of Classification Search
CPC .... G02B 27/01; G02B 27/0093; G02B 30/34; G02B 2027/014; G02B 2027/0138;
(Continued)

(56) References Cited

U.S. PATENT DOCUMENTS

2011/0228059 A1    9/2011  Nagai
2013/0235169 A1*   9/2013  Kato ...................... G02B 27/01
                                                      348/53
(Continued)

FOREIGN PATENT DOCUMENTS

JP      07225351 A    8/1995
JP      08191419 A    7/1996
(Continued)

OTHER PUBLICATIONS

International Preliminary Report on Patentability and Written Opinion for corresponding PCT Application No. PCT/JP2018/006283, 15 pages, dated Sep. 3, 2020.
(Continued)

*Primary Examiner* — Neil R Mikeska
(74) *Attorney, Agent, or Firm* — Matthew B. Dernier, Esq.

(57) ABSTRACT

The image processing apparatus acquires image data to be displayed and generates an initial image to output the image to a head-mounted display. Further, the apparatus generates a reference image including an image for a left eye and an image for a right eye and representing an image of an object viewed from two viewpoints spaced apart horizontally. In the case where the inclination angle of the head of the user is other than 0 degrees, the apparatus rotates the image for the left eye and the image for the right eye in reverse to the head inclination, using one point defined on a view screen, as a common axis. The apparatus outputs the image data to the head-mounted display regardless of the presence or absence of rotation. The apparatus repeats the processes until the display ends.

8 Claims, 11 Drawing Sheets

(51) Int. Cl.
  *H04N 13/344*   (2018.01)
  *G02B 27/00*    (2006.01)
  *G02B 27/01*    (2006.01)

(52) U.S. Cl.
  CPC ......... *H04N 13/344* (2018.05); *H04N 13/383* (2018.05); *G02B 2027/0129* (2013.01)

(58) Field of Classification Search
  CPC .......... G02B 2027/0134; G02B 27/017; G02B 2027/0187; H04N 13/344; H04N 13/383; H04N 13/378; G06F 3/013
  See application file for complete search history.

(56)           References Cited

U.S. PATENT DOCUMENTS

| 2016/0035140 | A1* | 2/2016 | Bickerstaff | G06T 19/006 |
| | | | | 345/633 |
| 2018/0181196 | A1* | 6/2018 | Lee | H04N 5/225251 |
| 2019/0158809 | A1* | 5/2019 | Sasaki | H04N 13/117 |
| 2019/0164354 | A1* | 5/2019 | Sasaki | G02B 27/0101 |
| 2020/0402308 | A1* | 12/2020 | Suzuoki | G06T 19/00 |

FOREIGN PATENT DOCUMENTS

| JP | 2011193348 A | 9/2011 |
| JP | 2017046065 A | 3/2017 |

OTHER PUBLICATIONS

International Search Report for corresponding PCT Application No. PCT/JP2018/006283, 4 pages, dated May 15, 2018.

* cited by examiner

FIG.3
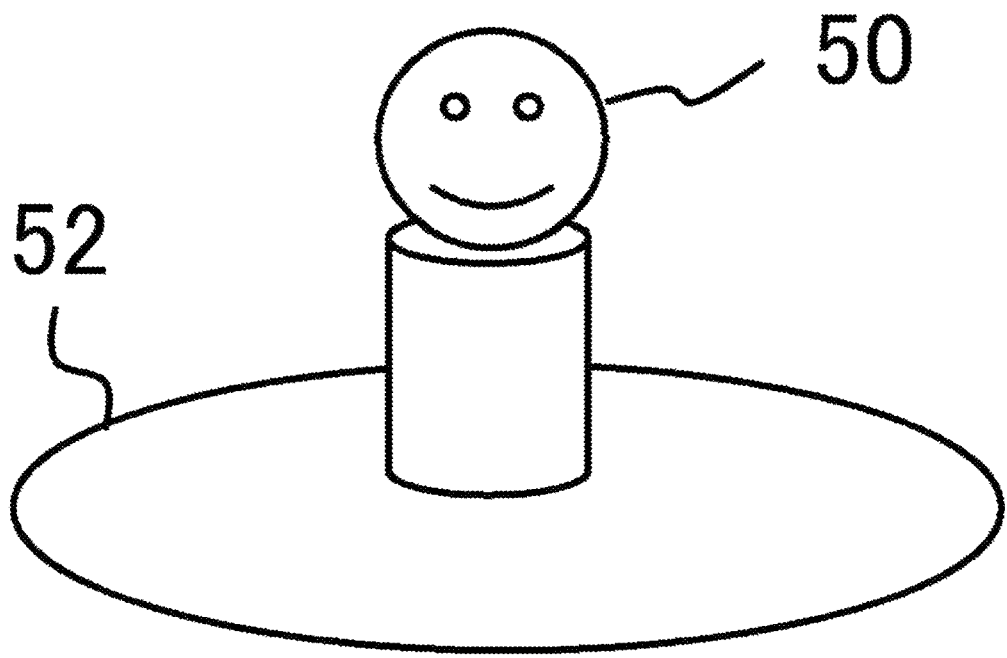
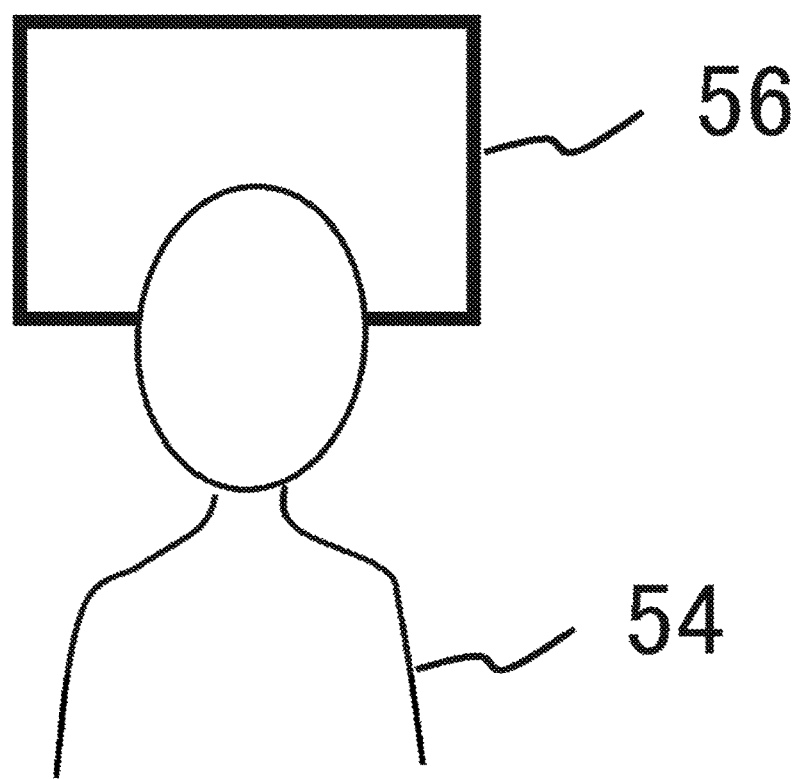

IMAGE PROCESSING APPARATUS AND IMAGE PROCESSING METHOD

TECHNICAL FIELD

The present invention relates to an image processing apparatus and an image processing method for displaying stereoscopic images.

BACKGROUND ART

In recent years, three-dimensional display devices such as a 3D television and a head-mounted display that can present an image three-dimensionally have become widespread. Devices allowing stereoscopic viewing of images on portable terminals such as mobile phones and portable game machines have also been developed, and the opportunity for ordinary users to view stereoscopic images has increased.

The three-dimensional display device enables stereoscopic viewing by allowing the user to view an image having parallax with the right and left eyes. In order to present different images having parallax between the right and left eyes, a method using special optical glasses, a method using a parallax barrier or a lenticular lens without using optical glasses, and the like have been put to practical use. In the case of using a head-mounted display, an image for the left eye and an image for the right eye are individually displayed in each of screen regions located in front of the right and left eyes.

SUMMARY

Technical Problem

In order to enable a stereoscopic image to be viewed without distortion, it is necessary to generate an accurate parallax image based on the positions of the right and left eyes. Further, in the case of producing a state of immersion in the virtual world by using a head-mounted display, it is necessary to change the field of view of the right and left images according to the movement of the user's head. Therefore, in a strict sense, it is necessary to perform processes of arranging an object in the virtual three-dimensional space, moving the right and left view screens corresponding to the display screen according to the movement of the head, and further executing perspective projection of the object. However, as the quality and accuracy of the image are pursued, the time required for such processing increases, and it becomes difficult for the display to follow the movement of the head.

The present invention has been made in view of such a problem, and an object thereof is to provide a technology that allows stereoscopic images to continuously be presented on a head-mounted display in an easy and suitable manner.

Solution to Problem

An embodiment of the present invention relates to an image processing apparatus. This image processing apparatus is one for presenting a stereoscopic image by a head-mounted display and has a feature of including a reference image acquiring section that acquires a reference image including a pair of an image for the left eye and an image for the right eye, and representing an object viewed from two viewpoints horizontally separated from each other, an inclination angle acquiring section that acquires the inclination angle of the vertical axis of the head of the user wearing the head-mounted display with respect to the vertical direction in a plane parallel to the screen, an image converting section that performs a conversion process of rotating the image for the left eye and the image for the right eye around a common axis in a virtual space including the object, on the basis of the inclination angle, and an output section that outputs the data of the image for the left eye and the image for the right eye subjected to the conversion process to the head-mounted display.

Another embodiment of the present invention relates to an image processing method. This image processing method is a method for processing an image by using an image processing apparatus configured to present a stereoscopic image by a head-mounted display and has a feature of including a step of acquiring a reference image including a pair of an image for the left eye and an image for the right eye, and representing an object viewed from two viewpoints horizontally separated from each other, a step of acquiring the inclination angle of the vertical axis of the head of the user wearing the head-mounted display with respect to the vertical direction in a plane parallel to the screen, a step of performing a conversion process of rotating the image for the left eye and the image for the right image around a common axis in a virtual space including the object, on the basis of the inclination angle, and a step of outputting the data of the image for the left eye and the image for the right eye subjected to the conversion process to the head-mounted display.

In addition, any combination of the above-described components and any conversion of the expression of the present invention among a method, an apparatus, and the like are also effective as embodiments of the present invention.

Advantageous Effect of Invention

According to the present invention, a stereoscopic image can be presented on a head-mounted display in an easy and suitable manner.

BRIEF DESCRIPTION OF DRAWINGS

FIG. 3 is a diagram for illustrating a display mode achieved by the image display system according to the present embodiment.

DESCRIPTION OF EMBODIMENT

Figure 1:
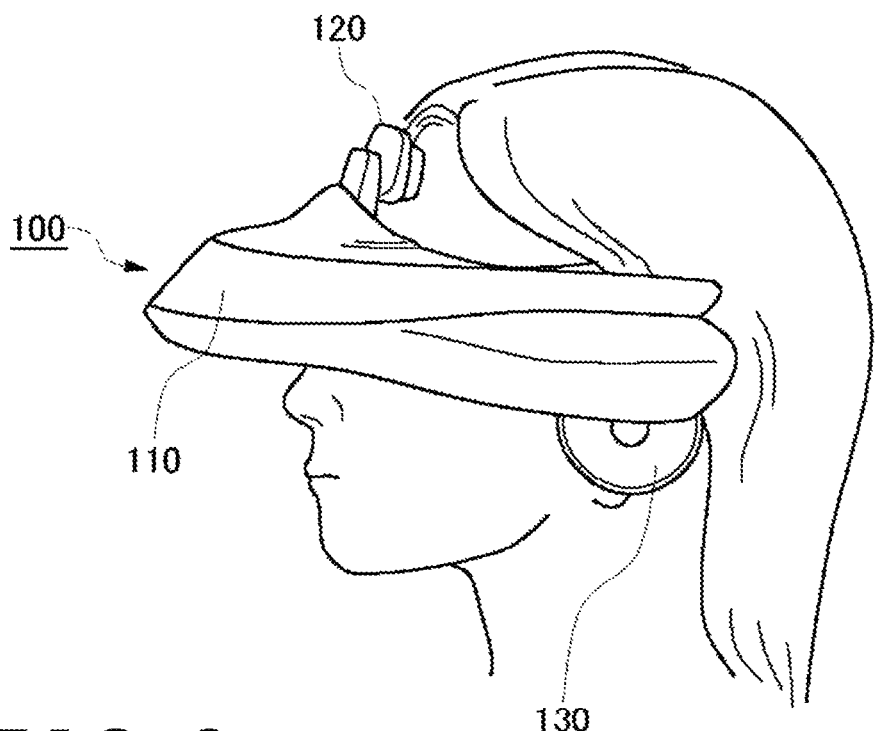
FIG. 1 is a diagram illustrating an example of the appearance of a head-mounted display according to the present embodiment.

The present embodiment relates to a technique for allowing stereoscopically viewing of an object in a head-mounted display. FIG. 1 illustrates an example of the appearance of a head-mounted display. A head-mounted display 100 includes a main body unit 110, a frontal region contact unit 120, and a temporal region contact unit 130. The head-mounted display 100 is a display device that is worn by a user on the user's head for viewing a still image or a moving image displayed on the display and for listening to sound or music output from headphones. By using a motion sensor built in or externally attached to the head-mounted display 100, posture information such as the rotation angle and inclination of the head of the user wearing the head-mounted display 100 can be measured.

Figure 2:
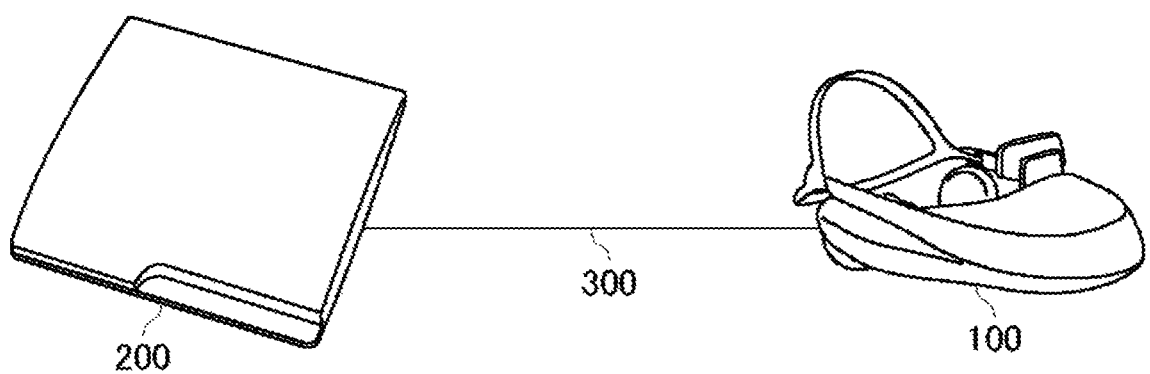
FIG. 2 is a configuration diagram of an image display system according to the present embodiment.

FIG. 2 is a configuration diagram of the image display system according to the present embodiment. The head-mounted display 100 is connected to an image processing apparatus 200 via an interface 300 that connects peripheral devices such as a wireless communication unit or a USB thereto. The image processing apparatus 200 generates display image data and transmits the data to the head-mounted display 100. The contents and display purposes of the image generated here are not particularly limited and may be a moving image, a still image, a captured image, or computer graphics.

In any case, the image processing apparatus 200 generates data of a pair of a display image for the left eye and a display image for the right eye in which images of the same object appear with parallax. Then, the object is stereoscopically viewed by controlling in such a manner that each image is displayed in each of the screen areas corresponding to the right and left eyes of the user wearing the head-mounted display 100. The basic technology of such a stereoscopic image display is conventionally known.

Note that the image processing apparatus 200 may further be connected to an unillustrated server via a network. In such case, the server may provide the image processing apparatus 200 with data of the electronic content accompanied by the display of the stereoscopic image. The image processing apparatus 200 may be any of an image reproducing apparatus, a content processing apparatus, a game device, a personal computer, a portable terminal, and the like. Further, the image processing apparatus 200 and the head-mounted display 100 may be configured integrally.

FIG. 3 is a diagram for illustrating a display mode attained by the image display system. In the present embodiment, a state in which a user 54 views an object 50 existing on a field 52 in a virtual three-dimensional space via a view screen 56 is created. Here, the view screen 56 corresponds to the field of view of the image displayed on the head-mounted display 100.

In the case where a tilt of the head occurs such as when the user 54 tilts the user's head while looking at the object 50, the display image is tilted in the opposite direction, so that the object 50 itself appears to be fixed and thus can give a feeling as if the user 54 were actually present in the field 52. Note that the field 52 merely represents a three-dimensional coordinate system of the virtual space and is not intended to limit the shape or the like. Also, it is not always necessary to display the field.

Figure 4:
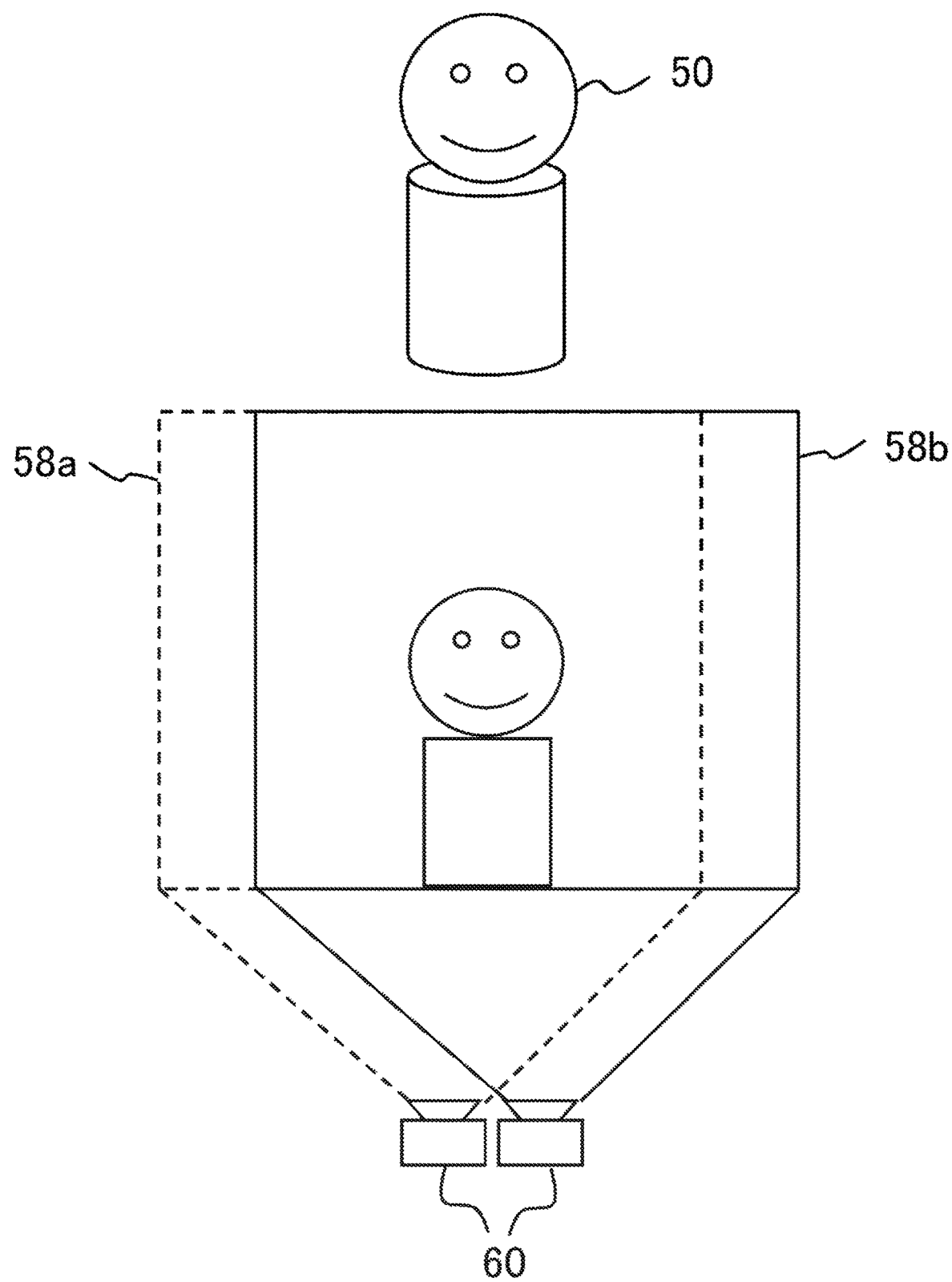
FIG. 4 is a diagram for illustrating an original image prepared for allowing stereoscopic viewing of an object in the display mode according to the present embodiment.

FIG. 4 is a diagram for illustrating an original image prepared for stereoscopically viewing the object 50 in the display mode illustrated in FIG. 3. In the present embodiment, an image representing the object 50 and having an appropriate parallax is prepared in advance. For example, as illustrated in FIG. 4, an original image 58a for the left eye and an original image 58b for the right eye are obtained by capturing images of the object 50 with a stereo camera 60. The stereo camera 60 is a general device including two cameras horizontally arranged at a predetermined interval.

Since the optical axes of both cameras are separated in the horizontal direction, the images of the same object 50 appear to the right in the original image 58a for the left eye and to the left in the original image 58b for the right eye. For example, if the distance between the two cameras of the stereo camera 60 is substantially the same as the distance between the pupils of both eyes of a person, the images appearing in the original image 58a for the left eye and the original image 58b for the right eye have a state similar to the image formation state of the right and left eyes at the time of actually viewing the object 50. In this case, the total field of view of the right and left eyes is an area where the original image 58a for the left eye and the original image 58b for the right eye are combined and corresponds to the view screen 56 in FIG. 3.

Note that, as described above, the original image is not limited to a captured image and may be computer graphics or may be an image in which computer graphics are drawn on a captured image. Further, the image may be a still image or a moving image or may be an image in which an object interacts with some input information such as a user's voice or motion. In any case, as illustrated in the drawing, a pair of images representing a state made by viewing a common space from right and left viewpoints having a predetermined distance is prepared. By using this for the display, the processing load caused by repeating the processing such as the perspective projection of the object 50 in the three-dimensional space on the view screen on the place can be reduced.

Figure 5:
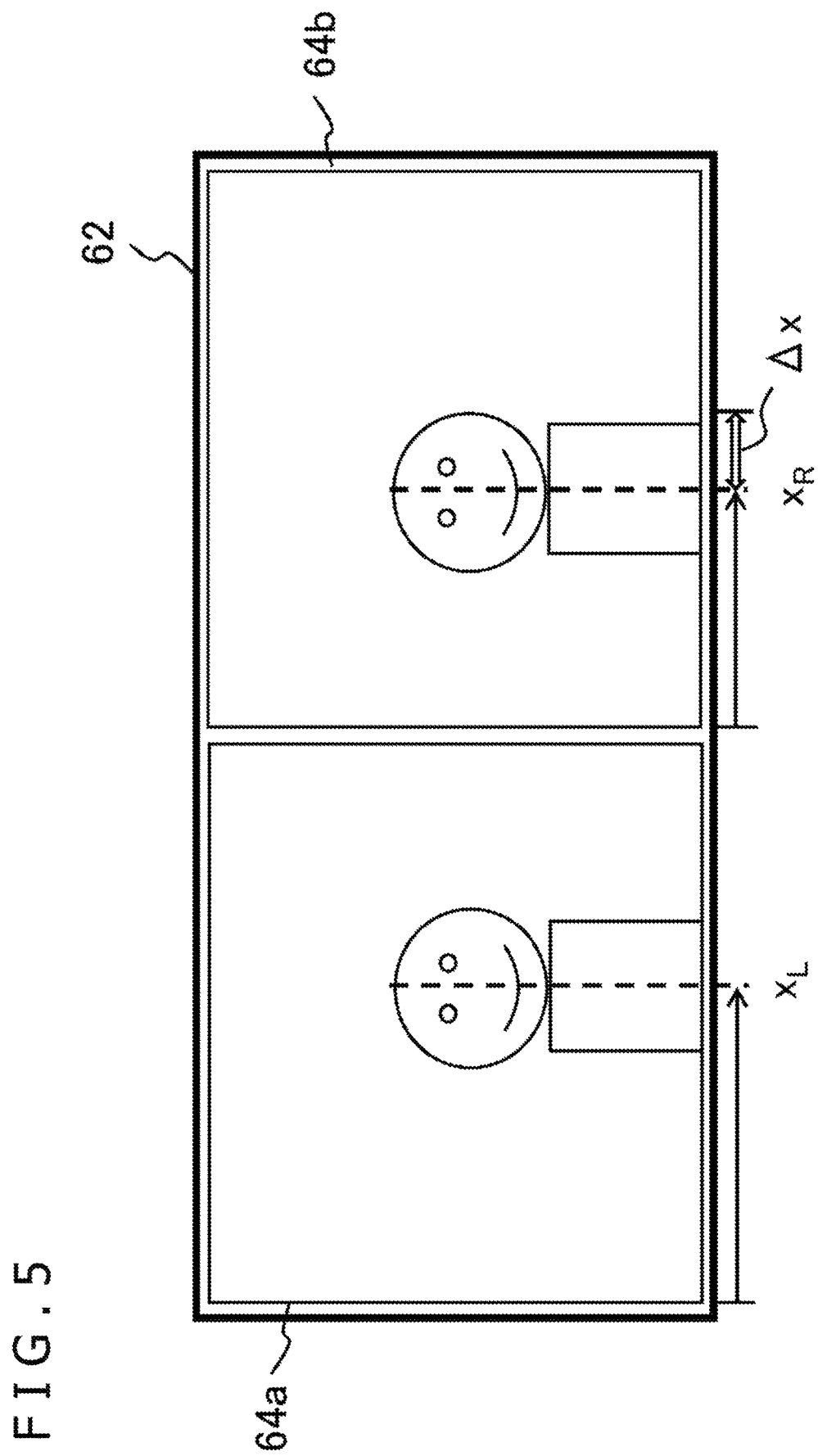
FIG. 5 is a diagram schematically illustrating a state in which a prepared original image is displayed on a head-mounted display in the present embodiment.

FIG. 5 schematically illustrates a state in which the prepared original image is displayed on the head-mounted display 100. On a screen 62 of the head-mounted display 100, a display image 64a for the left eye is displayed in the left area facing the user's left eye, and a display image 64b for the right eye is displayed in the right area facing the right eye. When the positions of the images of the objects in the display image 64a for the left eye and the display image 64b for the right eye are indicated by distances $x_L$ and $x_R$ respectively from the left end of each image, a parallax of $x_L - x_R = \Delta x$ occurs between both images. Due to the parallax $\Delta x$, the object can visually be recognized three-dimensionally by the user who views the object with both eyes.

In a strict sense, the appropriate parallax $\Delta x$ is determined by the distance between the right and left pupils and the distance to the object in the virtual space. Therefore, as described above, by acquiring the original image under such a condition that each of the view frustums including the right and left cameras of the stereo camera 60 substantially agrees with the right and left view frustums formed by the user's viewpoint in the virtual space, the original image 58a for the left eye and the original image 58b for the right eye can be used as the display image 64a for the left eye and the display image 64b for the right eye, respectively.

Note that a lens may be arranged between the screen 62 of the head-mounted display 100 and the eyes of the user so that the displayed image can visually be recognized in a wide field of view. In this case, reverse correction of lens distortion is performed on an actual display image so that an image without distortion is visually recognized when viewed through the lens. Since the correction is a general technique, description thereof will be omitted below. Further, the output method of the right and left display images is not limited to the illustrated one, and a parallax barrier, a lenticular lens method, or the like may be employed.

In such a display mode, in the case where the user wearing the head-mounted display 100 tilts the vertical axis of the head by tilting the user's head or the like, it is necessary not to tilt the image of the object 50 itself in the virtual world even if the frame of the screen is tilted. Even when the head is not tilted intentionally, if the image moves so as to follow the unconscious slight movements, the sense of reality of the object is impaired. Therefore, the image processing apparatus 200 acquires the measurement value of the motion sensor provided in the head-mounted display 100, performs a conversion process on the display image so as to correspond to the inclination of the head, and transmits the converted image to the head-mounted display 100.

Figure 6:
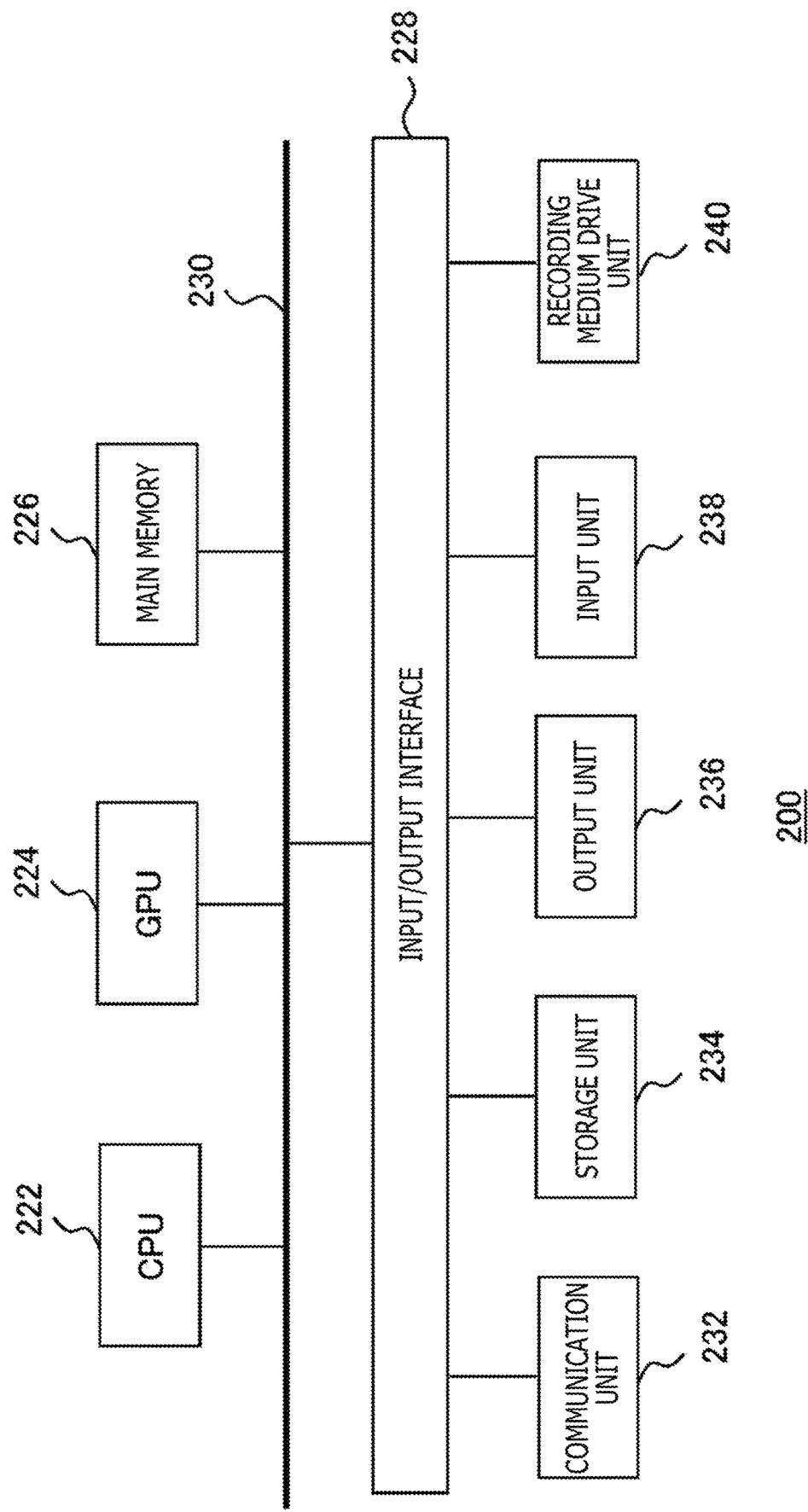
FIG. 6 is a diagram illustrating an internal circuit configuration of an image processing apparatus according to the present embodiment.

FIG. 6 illustrates an internal circuit configuration of the image processing apparatus 200. The image processing apparatus 200 includes a CPU (Central Processing Unit) 222, a GPU (Graphics Processing Unit) 224, and a main memory 226. These components are interconnected via a bus 230. Further, an input/output interface 228 is connected to the bus 230.

A communication unit 232 including a peripheral device interface of a USB or IEEE1394 or a wired or wireless LAN network interface, a storage unit 234 such as a hard disk drive or a non-volatile memory, an output unit 236 for outputting data to the head-mounted display 100, an input unit 238 for inputting data from the head-mounted display 100, and a recording medium drive unit 240 for driving a removable recording medium such as a magnetic disk, an optical disk, or a semiconductor memory are connected to the input/output interface 228.

The CPU 222 controls the entire image processing apparatus 200 by executing an operating system stored in the storage unit 234. The CPU 222 also executes various programs read out from the removable recording medium and loaded into the main memory 226 or downloaded via the communication unit 232. The GPU 224 has a function of a geometry engine and a function of a rendering processor, performs a drawing process in accordance with a drawing command from the CPU 222, and stores a display image in an unillustrated frame buffer. Then, the display image stored in the frame buffer is converted into a video signal and output to the output unit 236. The main memory 226 includes a RAM (Random Access Memory) and stores programs and data necessary for processing.

Figure 7:
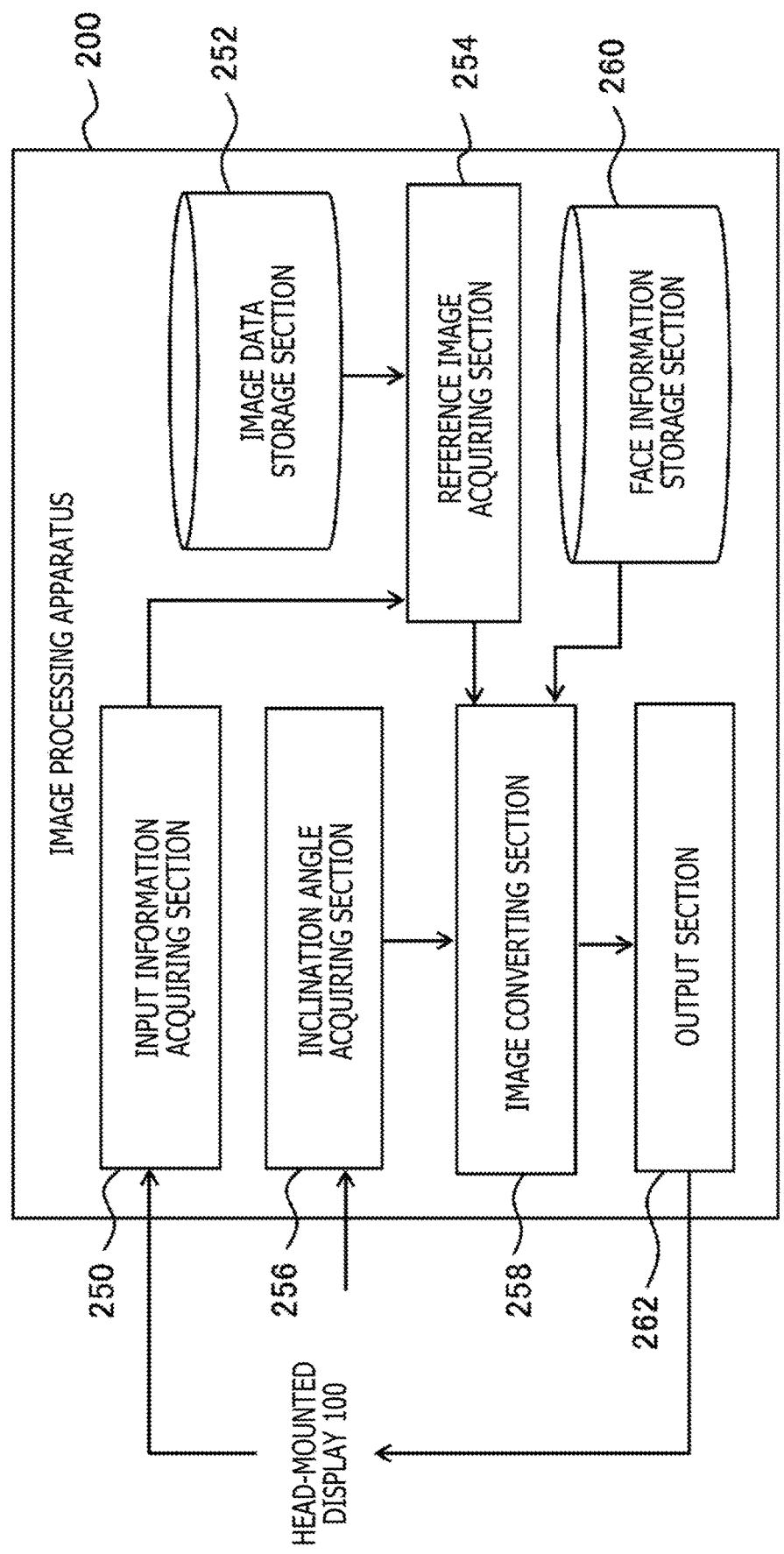
FIG. 7 is a diagram illustrating a configuration of functional blocks of the image processing apparatus according to the present embodiment.

FIG. 7 illustrates a configuration of functional blocks of the image processing apparatus 200 according to the present embodiment. Note that at least a part of the functions illustrated in FIG. 7 may be implemented in the head-mounted display 100. Alternatively, at least a part of the functions of the image processing apparatus 200 may be implemented in a server connected to the image processing apparatus 200 via a network. Further, the image processing apparatus 200 may be a part of an information processing apparatus such as a game machine or a personal computer.

FIG. 7 illustrates a block diagram focusing mainly on a function of generating a display image among functions of the image processing apparatus 200. These functional blocks can be attained by the configuration of the CPU, GPU, various memories and the like in terms of hardware, as illustrated in FIG. 6 and can be attained by a program that is loaded from a recording medium to a memory and performs various functions such as a data input function, a data holding function, an image processing function, and a communication function in terms of software. Therefore, it is understood by those skilled in the art that these functional blocks can be achieved in various forms by only hardware, only software, or a combination thereof, and the present invention is not limited to any of these.

The image processing apparatus 200 includes an input information acquiring section 250 that acquires information related to a user operation, an inclination angle acquiring section 256 that acquires an inclination angle of a user's head, a reference image acquiring section 254 for generating the data of the reference image that should be displayed in a state of no head tilt, an image data storage section 252 for storing various kinds of data used for generating the data of the reference image, an image converting section 258 for performing a conversion process on the reference image according to the inclination of the head, a face information storage section 260 for storing information relating to a positional relation regarding a predetermined part of the face, and an output section 262 for outputting data of a display image.

The input information acquiring section 250 acquires information related to a user operation from the head-mounted display 100 or an unillustrated input device. For example, in the case where an icon is displayed on the head-mounted display 100 and a selection input by movement of the line of sight is implemented, the input information acquiring section 250 identifies the direction of the line of sight by acquiring acceleration and angular velocity with use of the motion sensor of the head-mounted display 100. In addition, the input information acquiring section 250 may identify the contents of the user operation by appropriately acquiring information from a general controller, an image capturing device, a microphone, or the like.

The reference image acquiring section 254 acquires a reference image in accordance with a user operation. Here, the reference image is an image in which a pair of display images having parallax in the horizontal direction is arranged on the right and left as illustrated in FIG. 5. In other words, the reference image acquiring section 254 acquires a reference image including a pair of an image for the left eye and an image for the right eye and representing an object viewed from two viewpoints that are horizontally separated. In a state where the user's head is upright, the reference image is displayed as it is, so that the object can visually be recognized three-dimensionally in the original posture. The image data storage section 252 stores data to be used by the reference image acquiring section 254 to acquire the reference image. In the present embodiment, the format and type of the image to be displayed are not limited.

For example, data obtained by compressing and encoding a still image or moving image captured or drawn in advance may be stored in the image data storage section 252, and the reference image acquiring section 254 may only decode and decompress the data. Alternatively, the image data storage section 252 may store image drawing rules and data of basic elemental images used therefor, and the reference image acquiring section 254 may generate the image on the spot in accordance with a user operation or the like. The virtual object may be drawn so as to be superimposed on each of the right and left captured images. In addition to storing the image data in the image data storage section 252, the image data may be obtained from a server connected via a network as described above, or data captured by an unillustrated stereo camera on the spot may be obtained via the input information acquiring section 250.

The inclination angle acquiring section 256 acquires the inclination angle of the user's head on the basis of the measurement value of the acceleration sensor provided in the head-mounted display 100. Here, the inclination angle of the head is the angle of the vertical axis of the head with respect to the vertical direction in a plane parallel to the screen. When the head is upright, the inclination angle is 0°, and as the inclination angle increases, the line connecting the right and left pupils deviates from the horizontal, so that parallax also needs to be generated in the direction of the line. The image converting section 258 converts the reference image according to the inclination angle of the head. Basically, the display image for the left eye and the display image for the right eye constituting the reference image are each rotated in the direction opposite to the inclination of the head, so that the object is fixed as viewed from the user.

Here, in order to allow the display image for the left eye and the display image for the right eye having parallax to be stereoscopically viewed properly even when the head is inclined, the rotation axes of both display images are appropriately set. In other words, the image converting section 258 performs a conversion process of rotating the image for the left eye and the image for the right eye around a common axis in the virtual space including the object, on the basis of the inclination angle of the head. A specific example will be described later. The face information storage section 260 stores information regarding the face (information regarding the positional relation concerning the parts of the face) for each user, which is used for setting the rotation axis. However, in the case where the rotation axis is set assuming an average face, the face information storage section 260 may be omitted. Further, in the case where the inclination angle of the head is 0°, the image converting section 258 does not need to perform the conversion process.

The output section 262 acquires the data of the display image on which the conversion process has been performed according to the inclination angle of the head from the image converting section 258 and transmits the data to the head-mounted display 100. At this time, correction may be performed in consideration of lens distortion as described above. Further, when displaying a moving image, naturally, the data of the display image generated at a predetermined rate is sequentially output.

Figure 8:
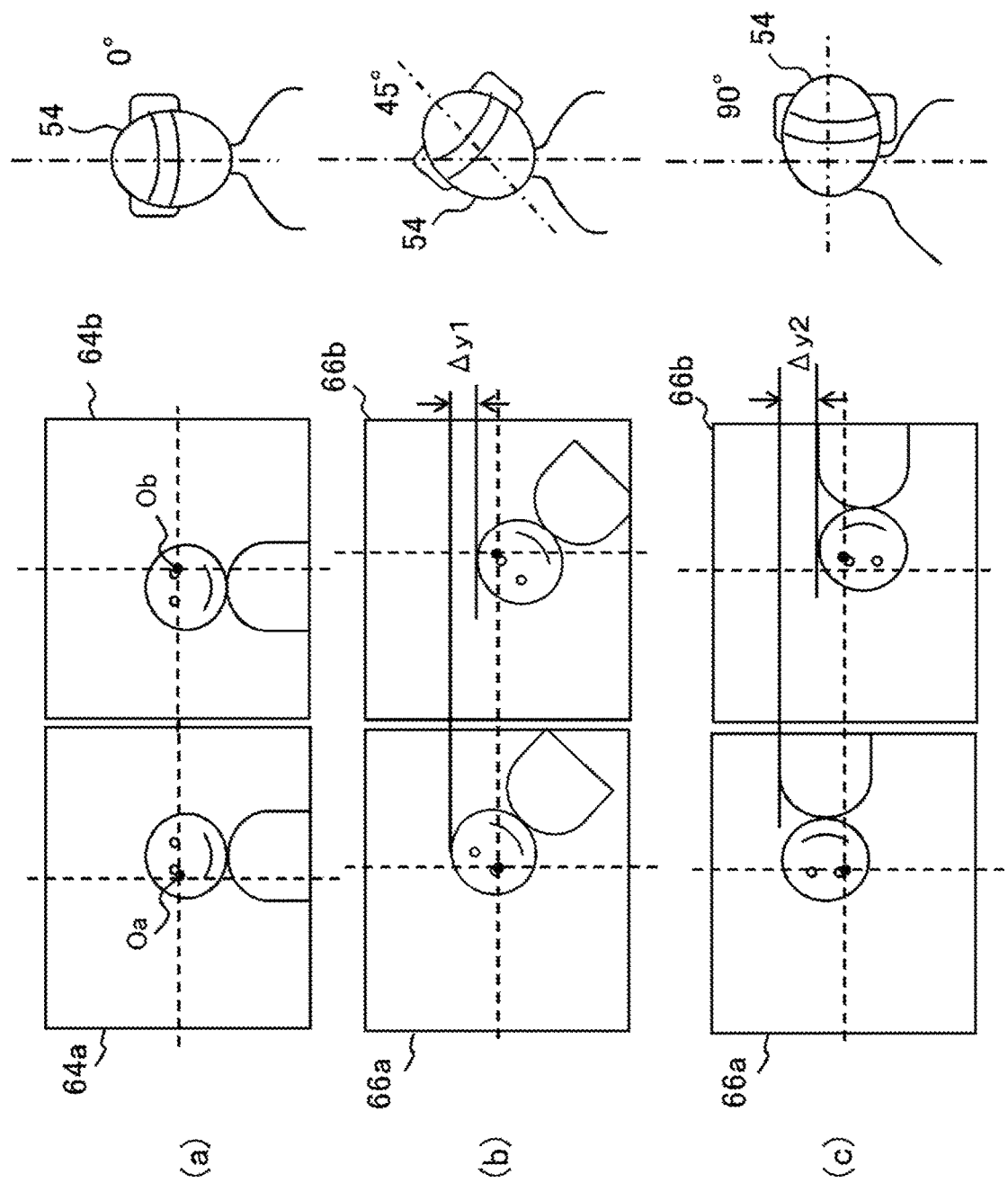
FIG. 8 depicts diagrams schematically illustrating a transition when a display image is rotated around the center of an image plane according to the inclination of the head of the user wearing the head-mounted display.

Next, in order to clarify the effect of the present embodiment, a problem in the case where the right and left display images constituting the reference image are simply rotated around the image center according to the inclination of the head will be described. FIG. 8 schematically illustrates the transition when the display image is rotated at the center of the image plane according to the inclination of the head of the user wearing the head-mounted display 100. On the right side of the figure, the inclination of the head of the user 54 is schematically illustrated as viewed from behind.

Subfigure (a) in the upper part of FIG. 8 illustrates a state in which the user's head is upright, that is, the inclination angle is 0°. In this case, the display image is the reference image itself, and the display image 64a for the left eye and the display image 64b for the right eye equivalent to the original images may be arranged on the right and left. Here, the centers of the display image 64a for the left eye and the display image 64b for the right eye are defined as origins Oa and Ob of the respective image planes. As described above, since the right and left display images have parallax, the origin Oa of the display image 64a for the left eye is located on the left of the object image and the origin Ob of the display image 64b for the right eye is located on the right of the object image.

Subfigure (b) in the middle of FIG. 8 illustrates a state where the user 54 tilts the head to the right by 45°. When a display image 66a for the left eye and a display image 66b for the right eye are rotated by 45° in the opposite direction around the origins Oa and Ob to correspond to such tilt, the object image is visually recognized as remaining in the upright state. On the other hand, in such case, the image of the object is displayed on the upper side in the display image 66a for the left eye, and the image of the object is displayed on the lower side in the display image 66b for the right eye so that a deviation of Δy1 occurs in the vertical direction as viewed from the user side, as illustrated in the figure. When the head is further tilted as illustrated in subfigure (c) at the bottom of FIG. 8 and the inclination angle becomes 90°, a vertical deviation Δy2 further increases.

That is, when observing the object with the parallax Δx, the images of the object in the right and left display images are deviated by Δxsinθ in the vertical direction with respect to the inclination θ of the head according to the rotation of the image as illustrated. This is due to the fact that the object is rotated independently by taking into account only the local coordinate system of the display image without considering the actual rotation axis around which the head is tilted. Such an operation is expressed as a conversion equation of the position coordinates of each pixel on the image as follows.

$$P'=PR(\theta) \qquad \text{(Equation 1)}$$

Here, P is the position coordinate of each pixel in the pre-rotation reference image, P' is the post-rotation position coordinate, and further, R(θ) is a rotation matrix around the image origin in the case where the inclination angle of the head is −θ. In the case of viewing the right and left display images obtained by this conversion equation, the user 54 visually recognizes the object as a double image in which the object is blurred vertically. As a result, the stereoscopic effect of the object is impaired, and a visually induced motion sickness may also be given. Therefore, in the present embodiment, a common rotation axis is set for the right and left display images in consideration of the actual rotation axis of the head.

Figure 9:
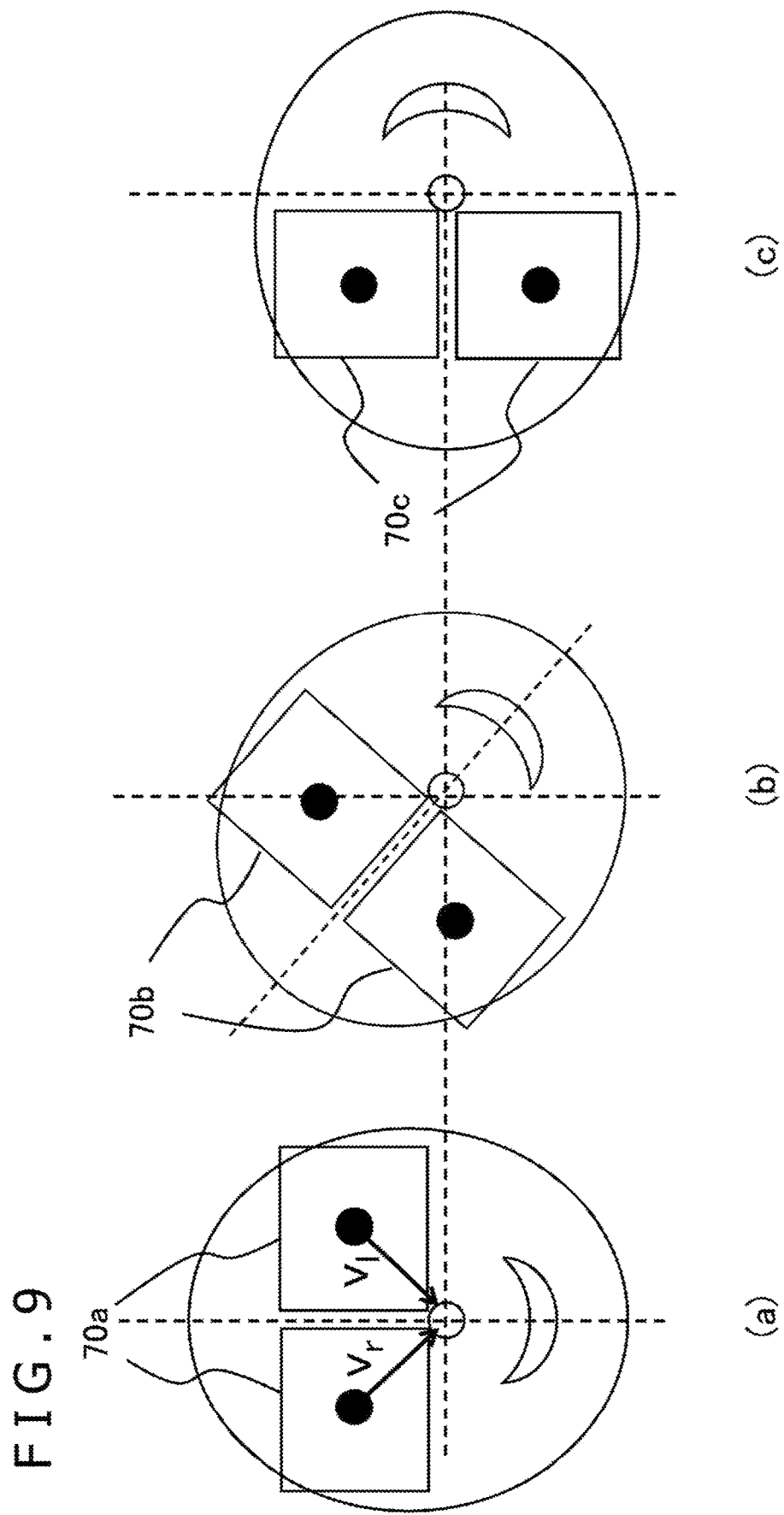
FIG. 9 depicts diagrams schematically illustrating how a display screen of the head-mounted display rotates according to the inclination of the head in the present embodiment.

FIG. 9 schematically illustrates how the display screen of the head-mounted display 100 rotates according to the inclination of the head. Subfigures (a), (b), and (c) of FIG. 9 each illustrate the face side of the user's head, and pairs of display areas 70a, 70b, and 70c for right and left images on the screen of the head-mounted display 100 are represented by rectangles. As illustrated, the pairs of display areas 70a, 70b, and 70c are positioned so as to face the user's both eyes. As illustrated in FIG. 8, the inclination angle of the head is 0° in subfigure (a) of FIG. 9, 45° in subfigure (b) of FIG. 9, and 90° in subfigure (c) of FIG. 9.

As illustrated in FIG. 9, the pair of display areas 70a, 70b, and 70c for right and left images revolves around the center of the user's face or the like as a common axis. In consideration of this characteristic, if the images represented in the pairs of display areas 70a, 70b, and 70c are rotated in the opposite direction around the corresponding axis, an image in which the object is fixed can be displayed while the inclination of the head is accurately reflected. Note that it can be understood that the mode illustrated in FIG. 8 corresponds to a state in which each of the pairs of display areas 70a, 70b, and 70c is rotated and does not reflect the actual rotation of the display area.

In order to rotate the reference image relatively in the opposite direction with respect to the rotation of the display area as illustrated, the following conversion equation is introduced.

$$P_l'=P_l T_l(v_l)R(\theta)T_l^{-1}(v_l)$$

$$P_r'=P_r T_r(v_r)R(\theta)T_r^{-1}(v_r) \quad \text{(Equation 2)}$$

Here, $P_l$ and $P_r$ are the position coordinates of each pixel of the display image for the left eye and the display image for the right eye in the pre-rotation reference image, and $P_l'$ and $P_r'$ are the position coordinates of each pixel of the post-rotation left-eye display image and right-eye display image. Further, $R(\theta)$ is a rotation matrix around the rotation axis in the case where the inclination angle of the head is $-\theta$, symbols $v_l$ and $v_r$ represent vectors from the pupils of the left eye and the right eye to the rotation axis, respectively, as illustrated in the figure, and $T(V_l)$ and $T(v_r)$ are parallel shift matrices corresponding to the vectors $v_l$ and $v_r$, respectively.

Note that the rotation axis of the head, which determines the rotation axis of the image, does not signify an intention of precisely measuring the actual rotation of the head and thus, may be positioned at a predetermined point near the center of the face such as the nose head, as a reference point. Alternatively, the calculation may be simplified by approximating the axis by the center of the pupils of both eyes. In any case, since the reference position on the face has the effect of improving the appearance of the object existing in front, the object facing the user can visually be recognized appropriately by selecting one point on the vertical center line of the face.

The vectors $v_l$ and $v_r$ from the pupil to such reference points vary depending on the person in a strict sense. Therefore, stable display can be obtained regardless of the person by storing data measured for each user in the initial calibration process in the face information storage section 260 and reading out the data during operation to adjust Equation 2. Alternatively, general values may be stored in association with attributes such as age and gender, and corresponding data may be read out according to the profile of the user. Alternatively, as described above, only the data for an average face may be set.

Figure 10:
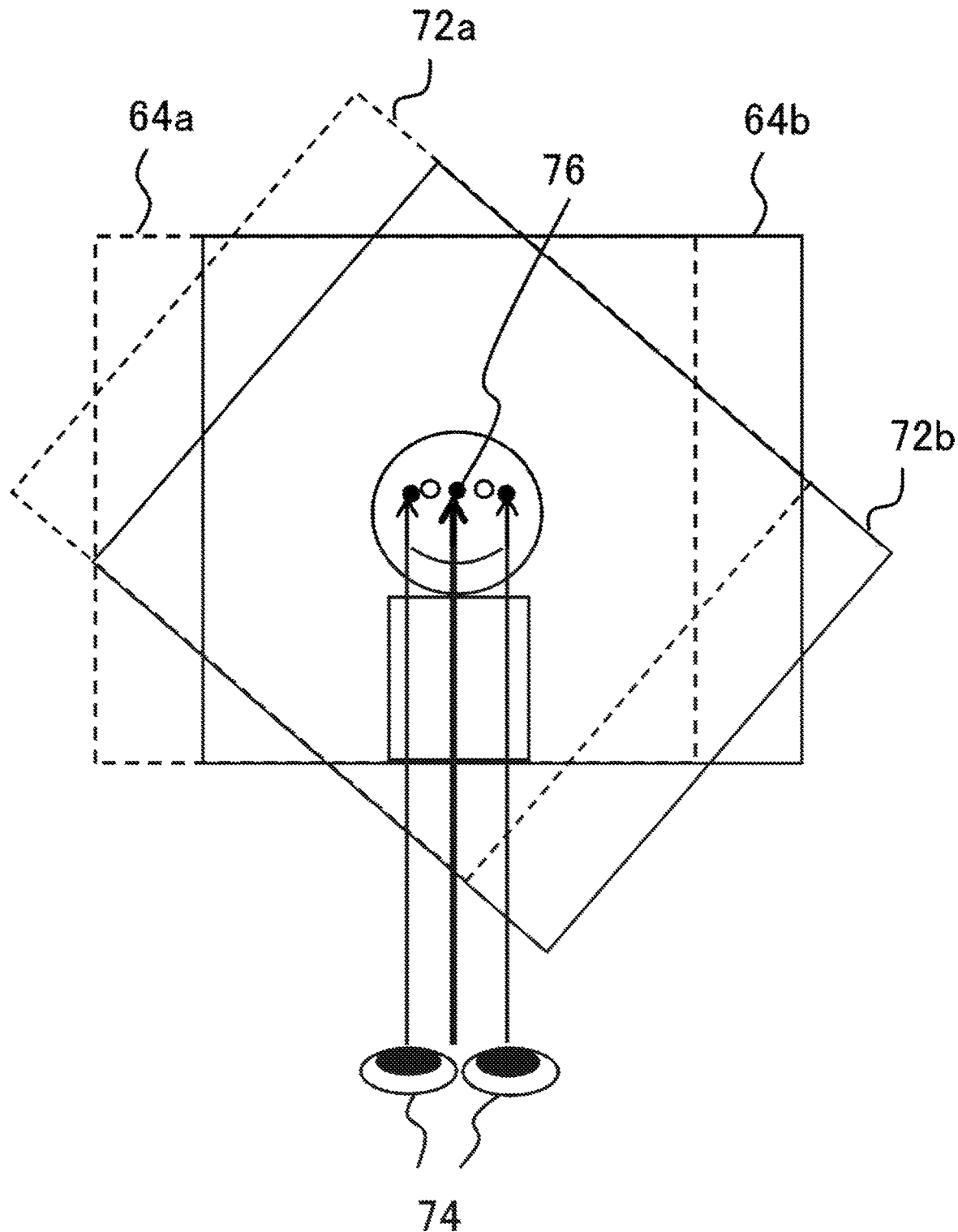
FIG. 10 is a diagram for illustrating a concept of rotating a reference image according to the inclination of the head in the present embodiment.

FIG. 10 is a diagram for illustrating the concept of rotating the reference image by a common axis according to the inclination of the head. This figure schematically illustrates the relation between user's both eyes 74 and the view screen in the virtual space. As described in FIG. 4, the view screen is a union of the visual fields of the display image for the left eye and the display image for the right eye. The display image 64a for the left eye and the display image 64b for the right eye in the case where the inclination angle is 0° are in the state as described above and constitute the reference image. At this time, the point at which the lines of sight of both eyes intersect the view screen is the center of the right and left display images.

On the other hand, in order to rotate the display image so as to correspond to the rotation of the right and left display areas of the head-mounted display 100 as illustrated in FIG. 9, the rotation axis of the head, that is, the position of the foot of a perpendicular line from the predetermined position of the face such as the center of the face to the view screen (point 76 in FIG. 10), may be set as the rotation axis of the image, as illustrated by the thick arrow in FIG. 10. The vectors from the center of each display image to the point 76 are the same as the vectors $v_l$ and $v_r$ from the pupils of both eyes on the face to the rotation axis of the head such as the center of the face. As a result, an appropriate conversion can be carried out by Equation 2.

Figure 11:
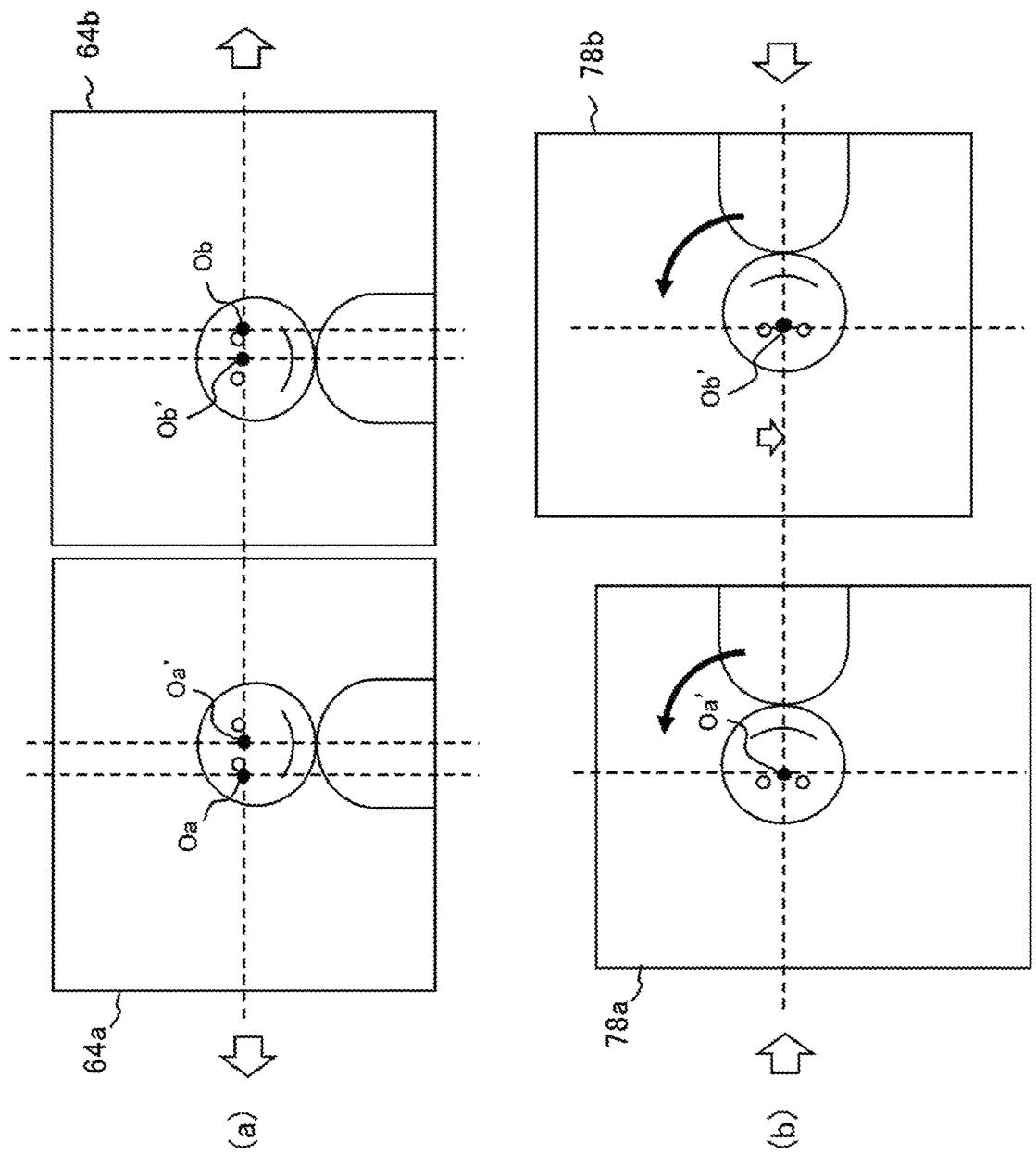
FIG. 11 depicts diagrams schematically illustrating a change when display images are rotated by a common axis in the present embodiment.

FIG. 11 schematically illustrates a change when a display image is rotated by Equation 2. Note that, here, for the sake of simplicity, the rotation axis of the head is approximated by the midpoint of both eyes. Subfigure (a) in the upper part of FIG. 11 illustrates the display image 64a for the left eye and the display image 64b for the right eye in the original reference image. First, the image is shifted in a parallel manner such that positions Oa' and Ob' corresponding to the midpoint of both eyes on the view screen become the origin of each image plane by using the shift matrices $T_l(v_l)$ and $T_r(v_r)$ of Equation 2. The positions Oa' and Ob' correspond to the point 76 in FIG. 10. At this time, the amount of shift of each image in the horizontal direction is half of the parallax $\Delta x$.

Then, as illustrated in subfigure (b) in the lower part of FIG. 11, display images 78a and 78b are rotated by the angle $\theta$ in the opposite direction corresponding to the inclination angle of the head with use of the rotation matrix $R(\theta)$ of Equation 2. In the illustrated example, $\theta=90°$ is satisfied. Further, when the amount of parallel shift in subfigure (a) of FIG. 11 is restored by $T_r^{-1}(v_r)$ and $T_l^{-1}(v_l)$ which are the inverse matrices of the shift matrices $T_l(v_l)$ and $T_r(v_r)$, a display image having appropriate parallax can be obtained. Also, as is apparent from the figure, since the right and left display images are rotated around the common axis, the image of the object does not cause the deviation in the vertical direction as illustrated in FIG. 8.

As a result, the object can appropriately and continuously be allowed to be viewed stereoscopically regardless of the inclination angle of the head. Note that FIG. 11 illustrates a stepwise operation for the sake of explanation, but in practice, the position coordinates after conversion can directly be derived for each pixel by Equation 2. Also, subfigure (b) of FIG. 11 illustrates a frame that is identical with the frame of the image illustrated in subfigure (a) of FIG. 11 in order to represent the state of rotation, but in reality, the display image is trimmed as appropriate and generated so as to be fit in the display area of the head-mounted display.

In the example described so far, it can be understood that the foot of the perpendicular line from the face center to the view screen is used as the rotation axis of the image in the virtual space so that the parallax of the object directly facing the user is once canceled and then rotated. On the other hand, in the case where another object exists at a different distance in the virtual space, the deviation of the image in the vertical direction may not be eliminated because the parallax is different. However, in the case of a head-mounted display, since the object to which the user is paying attention is likely to face the center of the face, rotating the entire image with respect to the object brings a high effect most easily in terms of recognition.

Note that in some cases, the position of the rotation axis may be changed for each object, or the operation of the parallel shift may be omitted. For example, since an object located far away in the virtual space originally has a small parallax, the image after rotation may be deviated on the contrary due to parallel shift with respect to the object on the near side. In this case, the conversion according to Equation 1 may be performed on the distant object. In other words, a threshold value may be provided for the difference of the distances in the depth direction toward the object facing the user, and the conversion equation of the rotation operation may be changed for an object having a difference larger than the threshold value.

Figure 12:
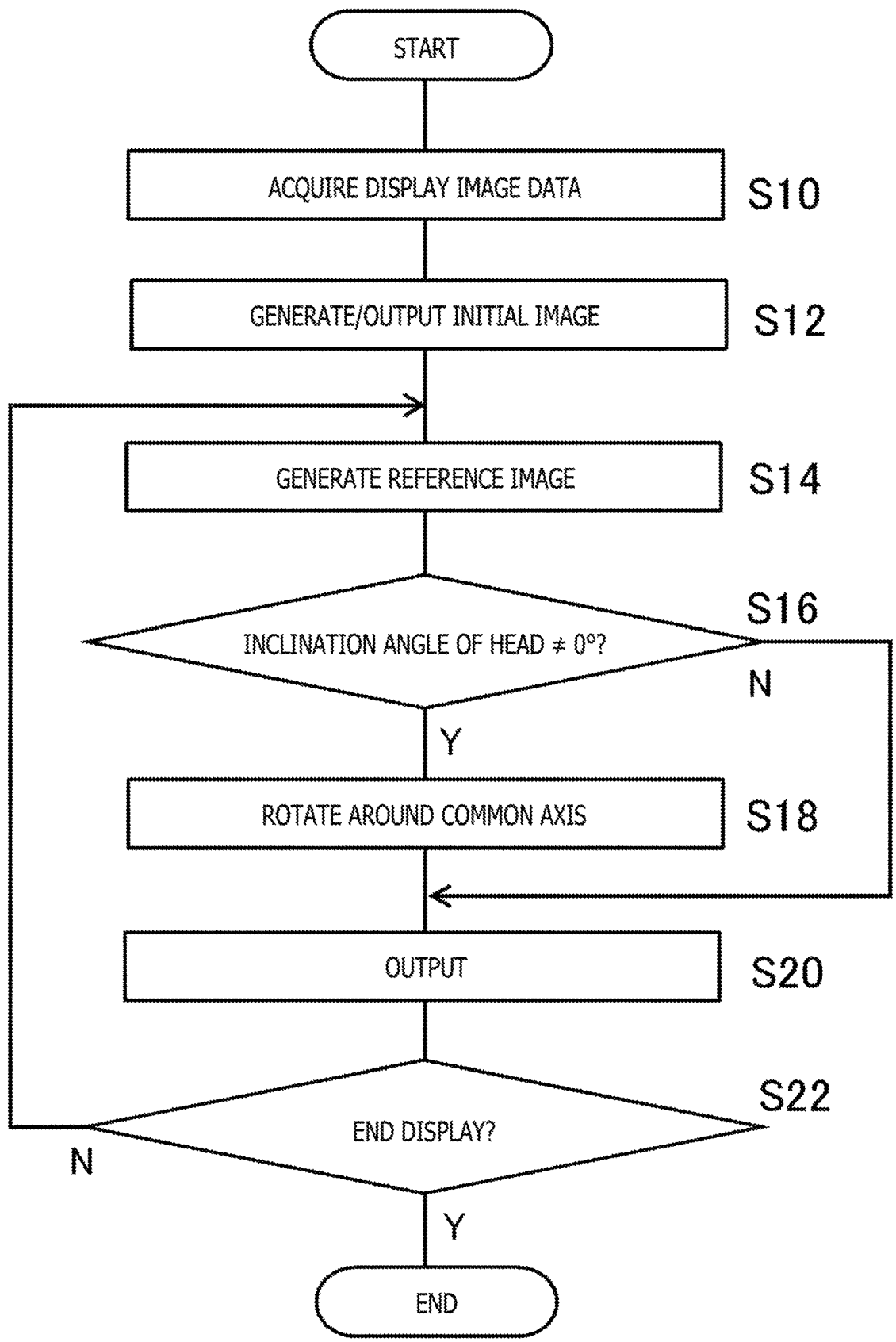
FIG. 12 is a flowchart illustrating a processing procedure in which the image processing apparatus generates and outputs an appropriate stereoscopic image according to the inclination of the user's head in the present embodiment.

Next, an operation of the image processing apparatus 200 achieved by the above-described configuration will be described. FIG. 12 is a flowchart illustrating a processing procedure of the image processing apparatus generating and outputting an appropriate stereoscopic image according to the inclination of the user's head in the present embodiment. This flowchart is started in a state where the electronic content is selected by the user wearing the head-mounted display, and the input information acquiring section 250 has acquired information regarding the image data to be displayed. In addition, it is assumed that the inclination angle acquiring section 256 receives the measurement value of the acceleration sensor from the head-mounted display and acquires the inclination angle of the head at any time.

In this state, the reference image acquiring section 254 acquires data of an image to be displayed (S10). As described above, this processing includes reading out and executing a program accompanied by image display such as a game or information processing in addition to the case of reading out the data of images subjected to compression coding from the image data storage section 252. Further, the image data may be obtained from a server via a network. Next, the reference image acquiring section 254 generates an initial image by using the acquired image data and outputs the image to the head-mounted display 100 (S12).

Further, the reference image acquiring section 254 generates a reference image of a subsequent frame by using the acquired image data (S14). The reference image includes a display image for the left eye and a display image for the right eye. Note that in the case where the display image is a still image or the like, the process of S14 is omitted as appropriate. In the case where the inclination angle of the head acquired by the inclination angle acquiring section 256 is 0° (N in S16), the image converting section 258 does not perform the rotation process, and the output section 262 outputs the data of the generated reference image to the head-mounted display 100 (S20). In the case where the inclination angle of the head is other than 0° (Y in S16), the image converting section 258 rotates each of the right and left images of the reference image (S18).

That is, the position of each pixel is converted by Equation 2 with use of a vector from each of the pupils of both eyes to a predetermined position of the face such as the center of the face. In the case of reflecting the user's personal facial features, the image converting section 258 reads out necessary data from the face information storage section 260 and generates a conversion equation. Then, the output section 262 outputs the data of the rotated image to the head-mounted display 100 (S20). If it is not necessary to end the display process because of a user operation or the end of a moving image or a game (N in S22), the process from S14 to S20 is repeated. When necessity to end the display process occurs, every processing is terminated (Y in S22).

According to the above-described present embodiment, in the technique of enabling stereoscopic viewing of the object by displaying the image for the left eye and the image for the right eye having parallax in the right and left screen regions of the head-mounted display, the display image is controlled according to the inclination angle of the head of the user. To be specific, the inclination is rotated in the opposite direction according to the angle of the vertical axis of the head in a plane parallel to the screen with respect to the vertical direction. At this time, one rotation axis common to the right and left display images is determined in consideration of the rotation axis around which the actual inclination of the head, and therefore the display, is caused to occur. For example, a point at which a perpendicular line from the center of the face or the midpoint of both eyes intersects the view screen in the virtual space is set as the axis.

To achieve this, operations such as shifting the display image so that the center of the display area of the right and left images on the display is located at the position of the axis, rotating the image according to the inclination angle of the head, and moving the image back by the amount of the shift are performed on the calculation. As a result, the image of the object can be displayed with an appropriate parallax without the deviation in the vertical direction, and the stereoscopic view of the object can be maintained without a feeling of strangeness. Further, a more exact display image can be generated by taking into account the size of each user's face and the distance from the pupil to the center of the face, and reflecting the data regarding each face in the conversion process.

Since the rotation process can be implemented by a simple operation on the image plane, the rotation process can achieve a stereoscopic image expression allowing the movement of the user's head with a remarkably light load as compared with the process of setting the position of the object in the virtual three-dimensional space and performing perspective projection on the view screen.

Hereinabove, the present invention has been described on the basis of the embodiments. The above embodiments are exemplifications, and it is understood by those skilled in the art that various modifications can be made to the combination of respective components and respective processing processes and that such modifications are also within the scope of the present invention.

REFERENCE SIGNS LIST

100 Head-mounted display
200 Image processing apparatus
222 CPU
224 GPU
226 Main memory
250 Input information acquiring section
252 Image data storage section
254 Reference image acquiring section
256 Inclination angle acquiring section
258 Image converting section
260 Face information storage section
262 Output section

INDUSTRIAL APPLICABILITY

As described above, the present invention is applicable to various information processing apparatuses such as a content processing apparatus, a game device, an image display device, an image reproducing device, and a personal computer and an information processing system including any of these.

The invention claimed is:
1. An image processing apparatus for presenting a stereoscopic image by a head-mounted display, the apparatus comprising:
a reference image acquiring section that acquires a reference image including a pair of an image for a left eye and an image for a right eye and representing an object viewed from two viewpoints horizontally separated from each other;

an inclination angle acquiring section that acquires an inclination angle of a vertical axis of a head of a user wearing the head-mounted display with respect to a vertical direction in a plane parallel to a screen;

an image converting section that performs a conversion process of rotating the image for the left eye and the image for the right eye around a common axis in a virtual space including the object, based on the inclination angle; and an output section that outputs data of the image for the left eye and the image for the right eye subjected to the conversion process to the head-mounted display; wherein common axis position depends on object distance in the virtual space from the user, such that when the object and another object in the virtual space are at different distances, from the user, in the virtual space, the common axis and a common axis for the another object are at different positions.

2. The image processing apparatus according to claim 1, wherein the image converting section rotates the image with a foot of a perpendicular line from a reference position on a face of the user to a view screen on which the image for the left eye and the image for the right eye are defined in the virtual space, as the common axis.

3. The image processing apparatus according to claim 2, wherein the image converting section sets a center of the face or a midpoint of both eyes as the reference position.

4. The image processing apparatus according to claim 2, wherein the image converting section performs the conversion process by using conversion equations $$P_l'=P_l T_l(v_l)R(\theta)T_l^{-1}(v_l)$$

$$P_r'=P_r T_r(v_r)R(\theta)T_r^{-1}(v_r)$$

when $P_l$ and $P_r$ are position coordinates of each pixel of the image for the left eye and the image for the right eye obtained before rotation, $P_l'$ and $P_r'$ are position coordinates of each pixel of the image for the left eye and the image for the right eye obtained after rotation, $R(\theta)$ is a rotation matrix around the common axis when the inclination angle is $-\theta$, $v_l$ and $v_r$ are vectors from pupils of both eyes of the user to the reference position respectively, and $T(v_l)$ and $T(v_r)$ are parallel shift matrices corresponding to the vectors $v_l$ and $v_r$ respectively.

5. The image processing apparatus according to claim 2, the apparatus further comprising:

a face information storage section that stores information related to a positional relation of parts of the face in association with each user, wherein the image converting section reads out information corresponding to the user wearing the head-mounted display from the face information storage section and determines a position of the common axis in the image for the left eye and the image for the right eye.

6. The image processing apparatus according to claim 2, wherein the image converting section changes a rotation rule of an image of an object different from the object represented at the foot of the perpendicular line on the view screen, according to a distance of the different object in a depth direction in the virtual space.

7. An image processing method of an image processing apparatus that presents a stereoscopic image by a head-mounted display, the method comprising:

acquiring a reference image that includes a pair of an image for a left eye and an image for a right eye and represents an object viewed from two viewpoints horizontally separated from each other;

acquiring an inclination angle of a vertical axis of a head of a user wearing the head-mounted display with respect to a vertical direction in a plane parallel to a screen;

performing a conversion process of rotating the image for the left eye and the image for the right eye around a common axis in a virtual space including the object, based on the inclination angle; and outputting data of the image for the left eye and the image for the right eye subjected to the conversion process to the head-mounted display; wherein common axis position depends on object distance in the virtual space from the user, such that when the object and another object in the virtual space are at different distances, from the user, in the virtual space, the common axis and a common axis for the another object are at different positions.

8. A non-transitory, computer-readable storage medium containing a computer program, which when executed by a computer that presents a stereoscopic image by using a head-mounted display to carry out actions, comprising:

acquiring a reference image that includes a pair of an image for a left eye and an image for a right eye and represents an object viewed from two viewpoints horizontally separated from each other;

acquiring an inclination angle of a vertical axis of a head of a user wearing the head-mounted display with respect to a vertical direction in a plane parallel to a screen;

performing a conversion process of rotating the image for the left eye and the image for the right eye around a common axis in a virtual space including the object, based on the inclination angle; and outputting data of the image for the left eye and the image for the right eye subjected to the conversion process to the head-mounted display; wherein common axis position depends on object distance in the virtual space from the user, such that when the object and another object in the virtual space are at different distances, from the user, in the virtual space, the common axis and a common axis for the another object are at different positions.

* * * * *